United States Patent [19]

Bloomfield

[11] Patent Number: 4,970,595
[45] Date of Patent: Nov. 13, 1990

[54] APPARATUS AND METHOD FOR PROCESSING VIDEO SIGNALS WITH KEY SIGNALS IN ACCORDANCE WITH PREVIOUS PROCESSING OF THE VIDEO SIGNALS

[75] Inventor: John F. Bloomfield, Salem, Mass.

[73] Assignee: Ampex Corporation, Redwood City, Calif.

[21] Appl. No.: 403,898

[22] Filed: Sep. 1, 1989

Related U.S. Application Data

[63] Continuation of Ser. No. 191,778, May 2, 1988, abandoned, which is a continuation of Ser. No. 119,223, Nov. 3, 1987, abandoned, which is a continuation of Ser. No. 851,195, Apr. 4, 1986, abandoned, which is a continuation-in-part of Ser. No. PCT/000734, Apr. 11, 1986, abandoned, which is a continuation-in-part of Ser. No. 722,532, Apr. 12, 1985, abandoned.

[51] Int. Cl.$^5$ ............................................. H04N 5/265
[52] U.S. Cl. ......................................... 358/183; 358/22
[58] Field of Search ................................... 358/183, 22

[56] References Cited

U.S. PATENT DOCUMENTS

| | | | |
|---|---|---|---|
| 3,673,324 | 6/1972 | Ito et al. | 358/22 |
| 3,728,479 | 4/1973 | Srinivasan | 358/183 |
| 4,001,498 | 1/1977 | Morishita et al. | 358/160 |
| 4,207,596 | 6/1980 | Pires | 358/182 |
| 4,334,245 | 6/1982 | Michael | 358/183 |
| 4,360,831 | 11/1982 | Kellar | 358/182 |
| 4,420,770 | 12/1983 | Rahman | 358/183 |
| 4,488,169 | 12/1984 | Yamamoto | 358/22 |
| 4,602,286 | 7/1986 | Kellar et al. | 358/183 |
| 4,621,280 | 11/1986 | Shinohara et al. | 358/183 |
| 4,684,990 | 8/1987 | Oxley | 358/183 |

FOREIGN PATENT DOCUMENTS 160549   11/1985   European Pat. Off. ............ 358/183

OTHER PUBLICATIONS

Storey, Teletrack—A Special Effect, BBC RD 1984/10 UDC 621.397.3, Sep. 1984, PH-263.
Kaiser et al., A Recent Innovation in Digital Special Effects, SMPTE Journal, Oct. 1978, pp. 673-676.

*Primary Examiner*—John W. Shepperd
*Attorney, Agent, or Firm*—Ralph L. Mossino; Douglas M. Gilbert

[57] ABSTRACT

The gain of an input video signal of different possible gains relative to a selected reference gain is adjusted according to an associated key signal indicative of gain change previously undergone by the input video signal and an independent key signal indicative of the desired change in gain to produce an output video signal having a selected gain determined by the values of the associated and independent key signals. The output video signal is combined with other video signals, whose gain may or may not have been adjusted relative to the reference gain.

44 Claims, 3 Drawing Sheets

_FIG_1

_FIG_2

FIG_4

FIG_5

FIG_6

APPARATUS AND METHOD FOR PROCESSING VIDEO SIGNALS WITH KEY SIGNALS IN ACCORDANCE WITH PREVIOUS PROCESSING OF THE VIDEO SIGNALS

This is a continuation of copending application 07/191,778, filed May 2, 1988, and now abandoned; which in turn was a continuation of copending application 07/119,223, filed Nov. 3, 1987 and now abandoned; which in turn was a continuation of copending application 06/851,195, filed Apr. 4, 1986 and now abandoned; which in turn was a continuation in-part of copending application PCT/US86/00734, filed Apr. 11, 1986 and now abandoned; which in turn was a continuation-in-part of copending application 06/722,532, filed Apr. 12, 1985 and now abandoned.

This invention relates generally to video signal gain control, and more particularly, to the control of the gain of video signals in accordance with a plurality of independently related video signal gain determining key signals.

In television production, it is often desirable to process a portion of a television signal less than the standard full field raster. For example, a common function of a digital special effects system is to compress a full field of video to a size smaller than the raster area occupied by a full size field of the television signal. In such a field of video, only the area corresponding to the compressed video image is of interest. The surrounding display area contains no information of interest. When this video signal is outputted to a utilization device, it is desirable for that device to know what area to process. This is the function of a matte or key signal that accompanies the compressed or otherwise processed video signal and defines the gain throughout the video signal interval.

A matte or video signal gain defining key signal effectively specifies the area of interest or the area to be processed. Key signals are commonly created during the processing of a video signals, but can also be independently created. For example, a key signal can be independently created that represents selected shapes. Television signals are commonly created by television cameras, graphic art generators and other devices. Key signals can be created by dedicated key signal generators, digital special effects units, and other video signal processing devices. A chroma-key generator creates a key signal corresponding to a specific color found in an input video signal and can be used as a video signal gain defining key. For example, if the video signal from a camera receiving an image of an object against a blue background and chroma-keyed on the blue color background, an object key can be produced from the chroma key signal. In the digital special effects system example discussed above, a key signal can be created that corresponds to the area of the compressed field of video.

A video gain defining key signal is used to control the gain of video signals over a range and with a resolution determined by the range and number of values the key signal can take. Normally, such keys are linear so that there is a one to one correspondence between each part of the key signal and the video signal. Typically, the gain of a video signal is adjusted by the key signal by multiplying the level of the video signal by the key signal. When operating in the analog domain, the instantaneous level or amplitude of the video signal is multiplied with the instantaneous value of the key signal on a continuous basis. Ordinarily, an analog key signal has a value between zero and one.

A digital video signal is composed of discrete digitally encoded samples defining pixels of the video image. Each pixel may be defined by a plurality of different components, such as a single luminance and a pair of chrominance components. In systems for such video signals, a digital key signal is used having a value between zero and one for each pixel of the video image. When processed, each pixel of the video signal is processed with its corresponding key signal. The value of a key signal often varies with time. In an analog system, the key value has an instantaneous value that changes with time, whereas in a digital system each pixel has a discrete associated key value.

One type of key signal is a bi-state key signal. This type of key signal has either a value of zero or one. When processed with a video signal, the portion of the key signal that has a value of zero is multiplied with the corresponding portion of the video signal to yield a processed or keyed video signal having a gain of zero, which is indicative of the absence of a video image. This portion of the keyed video signal appears as black when viewed on a monitor. The portion of the video signal that is processed with a key signal that has a value of one remains unchanged and is viewed on a monitor unchanged. In the aforediscussed object example, the portion of the key signal outside the representation of the object has a value of zero. The portion of the key signal corresponding to the inside of the object has a value of one.

The value of a key signal often is correspondingly processed proportionately with the gain of the video signal. If the values of two key signals are processed with their respective video signals representing two objects, the result would be a display of one of the objects shaped in the form of the other.

Another type of key signal is a linear key signal. Unlike the bi-state key signal which is restricted to either a value of zero or one, a linear key signal may have several values between zero and one. Whereas, with the bi-state key signal, one typically indicates the presence of the video signal and zero the absence of the video signal, the value of the linear key signal represents a continuum of change in gain of the video signal.

When a video signal is processed with a linear key signal, the corresponding signals are multiplied, as in the case of the bi-state key signal, but because the linear key can have any value between zero and one, the gain of the video signal can be adjusted to any value between zero and one. For example, if a point in a video signal is process with a linear key that has a value of 0.5, the gain of the video signal would be reduced in gain by one-half. When viewed on a monitor, the video signal would look semi-transparent.

In combining typical video signals, the total gain of the two signals is never made more than one. Two video signals of nominal gain would not be directly added, as their total gain would be two times the normal or nominal gain of a video signal past through the system. Adjusting the gain of a video signal with a key signal is one method of reducing the gain of video signals so that they can be combined with other video signals. Adding two gain adjusted video signals, each of which has been multiplied with a key signal of 0.5, would be permissible, as the gain of the combined video signals would only be one. The resulting video signal when viewed on a monitor would be a combination of both video signals.

One method of combining two video signals whose gains are nominal, i.e., not reduced, is to use an independent or external key signal to process the video signals. In this method, the independent key signal determines the amount of each of the two signals present in the combined or mixed video signals. The gain of one of the video signals is reduced directly by the key signal in a video processor, which multiplies the video signal by the key signal. The gain of the other video signal is reduced by one minus the value of the key signal, which is determined by a 1K key processor.

Generally, the gain of a video signal is processed by a key signal as a last step prior to forming the desired output video signal. There are situations, through, where it is necessary to process a video signal whose gain has been previously adjusted by another key signal. The way this has been done previously is to adjust the gain of the video signal without regard to any previous gain adjustment.

If, in the above example, the gain of the video signal had been previously reduced at a point, by a key signal of 0.5, its gain would be 0.5 of its original value. When its gain is reduced further by an independent key of, for example, 0.3, the result gain of the signal is reduced to 0.15. When combined with the second video signal, the combined video signal gain is only 0.85. This is undesirable for two reasons. First, the independent key value of 0.3 usually specifies the desired value for the gain of the related video signal. Because this video signal had already been reduced in gain, the processing by the independent key reduces its gain to a level below the desired level. Secondly, it is very desirable to fully use all the gain available for the combined video signal. The combined video signal, in this example, only has a gain of 0.85, not the desired 1.0.

A desirable method of combining one or more gain adjusted video signals, would take into account any previous gain adjustments of the video signals. There is a need for a method and apparatus which is able to combine previously gain adjusted video signals so as to obtain video signals with the desired gain specified by a key signal.

The present invention overcomes the limitations of the previous method by taking into account the previous gain reduction of video signals.

When gain adjusting a video signal with an independent key signal, the independent key signal is considered the desired level of gain reduction. If the video signal has already been reduced in gain below the level of the independent key signal, it is preferred not to reduce its gain further. This is because when the gain on a video signal is reduced, information is lost. That lost information cannot be recovered by raising the gain of video signals. Raising the gain adds false information or noise to the video signal.

If the video signal has been reduced in gain by an amount less than the desired level called for by the independent key signal, then the gain of the video signal is adjusted in accordance with the values of both the independent key and the reciprocal of the value of the key signal used to previously adjust the gain of the video signal. As will be described further hereinafter with reference to the preferred embodiments illustrated in the drawings, this can be conveniently accomplished in one step by multiplying the video signal with a key signal having a value corresponding to the ratio of the value of the independent key signal to the value of the key signal previously used to adjust the gain of the video signal. The result of so adjusting the gain of the video signal is the resulting video signal is reduced in gain by the precise amount to bring the total gain reduction as specified by the independent key.

To adjust the gain of a previously gain adjusted video signal with an independent key signal, it is preferred to determine the minimum between the values of the key signal previously used to adjust the gain of the video signal and the independent key signal that identifies the desired gain for the video signal. This is employed to determine which of the two key signals specifies the smaller video signal gain. Whichever key signal specifies the smaller gain, it is employed to determine the further gain adjustment of the video signal. If the independent key signal specifies the smaller gain, it is coupled to effect the further gain adjustment of the video signal. On the other hand, if the independent key signal specifies a larger gain, the key signal related to the video signal that previously caused adjustment of the gain of the video signal determine the further video gain adjustment of the video signal. In such event, the result is the video signal's gain remains the same as it was when previously adjusted by the related key signal. This minimum key signal value determination has the advantage of assuring that the gain of the resulting gain adjusted video signal is not increased above the gain it had as a result of the previous gain adjustment. In an embodiment wherein a ratio of key signals is employed to effect gain adjustment of the video signal, the key signal obtained as a result of the minimum determination is used to form the ratio relative to the key signal that determined the previous gain adjustment of the video signal, As can be appreciated from the foregoing, the ratio will be unity whenever the value of the independent key signal is larger than that of the key signal which determined the previous gain adjustment of the video signal. Consequently, no further adjustment of the gain of the video signal occurs under such circumstance.

To combine a gain adjusted video signal according to an independent key signal with a video signal whose gain has not been adjusted, the value of the input key signal signifying the input video signal gain and the value of the independent key are detected. The gain of the input video signal is adjusted in accordance with the value of the independent key signal and the reciprocal of the value of the input key signal to produce a first gain adjusted video signal. In addition, the difference between the gain of the first gain adjusted video signal and a reference gain value, usually, corresponding to unity video signal gain, is detected. In response to the detected difference, the gain of the video signal whose gain has not been previously adjusted is adjusted to a value determined by the detected difference to produce a second gain adjusted video signal. These two gain adjusted video signals are combined to produce a combined output video signal.

Apparatus to effect such combining of a previously gain adjusted video signal with a video signal whose gain has not been previously adjusted advantageously employs a minimum key signal value determining circuit to determine which of the two independent and input key signals has the smaller value. In the manner previously described, this minimum circuit operates to insure that the resulting gain of the combined video signal is not greater than that of the reference value, or unity. Moreover, when employed with a circuit for generating a ratio of the value of the independent key signal taken against the value of the input key signal, each of the gain adjustments of the two video signals is able to be performed in a single step with a single multiplier.

The present invention can be arranged to also combine two previously gain adjusted video signals according to an independent key signal. This is accomplished by first detecting the values of the independent key signal and each of the input key signals signifying the respective gains to which the two input video signals have been previously adjusted relative to a reference gain, typically unit. The gain of one of the two input video signals is adjusted in accordance with the value of the independent key signal and the reciprocal of the value of one of the input key signals to produce a first gain adjusted video signal. The difference between the gain of the first gain adjusted video signal and the reference gain is detected. In response to this detected difference, the gain of the other of the two video signals is adjusted according to the detected difference and the other of the two input key signals to produce a second gain adjusted video signal. These two gain adjusted video signals are combined to produce a combined output video signal.

Apparatus to effect such combining of two previously gain adjusted video signals advantageously employs two minimum key signal value determining circuits to insure that the resulting gain of the two gain adjusted video signals is not greater than that of the reference value, or unity. Furthermore, a pair of ratio determining circuits are utilized so that the gain adjustment of each of the two video signals is able to be performed respectively in a single step with a single multiplier. The manner in which such minimum circuits and ratio determining circuits function to effect such results will become more apparent upon consideration of the detailed descriptions of preferred embodiments of the present invention illustrated by the figures. Generally, however, in the operations performed by these circuits, the minimum between the value of the input key signal associated with a previously gain adjusted video signal and the value of the independent key, which signifies the desired gain for the video signal, is determined. The minimum value key signal is then further processed to obtain a value inversely proportional to the value of the associated input key. Consequently, when the value of the independent key signal is greater than the value of the associated input key signal, there will be no further adjustment of gain of the previously adjusted video signal. However, if the value of the independent key calls for a reduction in gain that is less than that to which the video signal has previously been adjusted, the minimum circuit will function to provide a value corresponding to that of the independent key signal, whereby the gain of the video signal is reduced to the level called for by the independent key.

Various of the above-mentioned and further features and advantages of the present invention will be apparent from the specific examples of an exemplary apparatus and method described hereinbelow with reference to the accompanying drawings, in which.

In accordance with the present invention, the video and key signals may either be in digital or analog form, although preferred form is digital. In an analog system, video signals are processed continuously with their corresponding key signals, although, at any one point in time, only one point in the video signal is being processed with the corresponding point in the key signal.

Further, the discussed embodiments are formed of combinations of one or more of six basic circuit elements. Each element can be implemented in a variety of ways in either an analog or digital system. Video signal gain adjustment devices used to adjust the gain of a video signal according to the value of a key signal can be conveniently implemented in a digital system as a digital multiplier. These are commonly available in standard integrated circuit packages. In a non-real time signal processing system, the video signal gain adjustment device can be implemented with a microprocessor. An analog video signal gain adjustment device can be implemented as a simple analog multiply circuit.

Another circuit element utilized in certain embodiments of the present invention is a video signal combiner. The video signal combiner is used to combine gain adjusted video signals to form an output video signal composed of a combination of input video signals after one or more of such signals have been gain adjusted. In a digital system, this element is easily implemented as a digital adder, which is also commonly available in standard integrated circuit packages. In an analog system, the video combiner can implemented as a simple mixing circuit.

A common element of preferred embodiments of the invention is a minimum signal value determining circuit. Such circuit is used to determine the minimum value between two key signals. In a digital system, this is accomplished by a digital comparator, which outputs as a key value signal the minimum of the values of two input key signals. In a digital system, these values are discrete numbers fed serially to the minimum signal value determining circuit. In an analog system, a minimum signal value circuit is conveniently implemented as an analog AND gate, which has the precise desired property.

Yet another circuit element employed in certain preferred embodiments of the present invention is a signal differencing circuit, which is used to determine a key value remainder signal. In a digital system, a digital adder can be used to add the negative of a received key signal to one. In an analog system, the value of a key signal is subtracted from a reference level signal, typically representative of unity signal gain, to produce the desired difference output.

A summing circuit is used to determine the sum of the values of two key signals. In a digital system, this can be implemented as a common digital adder. These as available in standard integrated circuit packages. In an analog system, the summing circuit can be implemented as analog add circuit. A summing circuit is employed in embodiments of the present invention where it is desired to provide a key signal indicative of the adjusted gain of the output video signal derived in accordance with the present invention and provided to a signal utilization device.

Another circuit element employed in preferred embodiments of the present invention is a signal value ratio determining circuit. The ratio determining circuit enables convenient generation of a composite key signal that is indicative of the reciprocal of the value of an input key signal that signifies the gain of an associated input video signal relative to a reference level, typically, representative of unity video signal gain, and of the value of an independent key signal indicating the desired gain for the video signal. The ratio determining circuit conveniently generates the composite key signal by dividing the independent key signal value by the value of the input key signal to obtain the ratio. In a digital system, this can be implement by an arithmetic processor circuit, which is commercially available. In the preferred embodiment, the independent and input key signals are employed as address signals for a look-up table in a ROM-type memory that stores values corresponding to the ratio of the two key signals. While such embodiments limits the resolution available, it is fast and low-cost. Analog division circuits are known in the art and can be constructed to perform the desired ratio determination.

Figure 1:
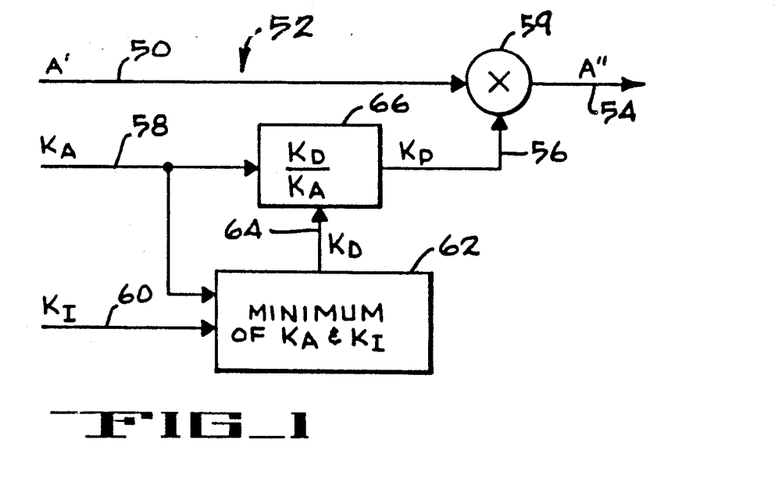
FIG. 1 is a schematic block diagram of one embodiment of a system for combining video signals of different possible gains in accordance with the present invention.

In one embodiment of the present invention, a system is arranged to process an input video signal, whose gain has been previously adjusted in accordance to a value of an associated input key signal, is further processed according to the value of an independent key. Referring to FIG. 1, a previously gain adjusted video signal A', 50, is coupled to a video signal gain adjustment circuit 52 to produce an output video signal A'', 54, for further adjustment of its gain in accordance with a processing or request key signal KP, 56 having a value indicating the desired gain for the output video signal A'', 54.

Key signal KP, 56, is generated in response to the input key signal KA, 58, associated with video signal A', 50, and an independent key signal KI, 60, and has a value determined by the values of the input and independent key signals. The associated key signal KA, 58, is an indicator of previous gain adjustment of the input video signal A'. The independent key, most often an externally generated key signal indicates the level of gain reduction wished for the output video signal A''. If the video signal A', 50, has been processed according to a key signal which has reduced the video signal's gain below the level of the independent key signal KI, it is desired no further gain reduction occur.

It is the task of minimum signal value determining circuit 62 to determine whether the input key signal KA, 58, indicates the video signal A', 50, has already been reduced in gain by the same amount or more than that requested by the independent key signal KI. If value of the key signal KA, 58, is less than that of the independent key signal KI, 60, the minimum circuit 62 outputs as a request key signal KD, 64, the input key signal KA, 58. If the value of the input key signal KA, 58, is more than that of the independent key signal KI, 60, the minimum circuit 62 outputs the independent key signal KI, 60, as the request key signal KD, 64. If the values of the two signals are equal, the minimum circuit 62 may be arranged to provide either signal as the request key signal KD, 64.

The output of minimum circuit 62 is coupled to a ratio signal value determining circuit 66. The input key signal KA, 58, and the request key signal KD, 64, are coupled to the input of the ratio circuit 66, which determines the ratio of the valued of the request key signal KD to the value of the input key signal KA. That ratio is output as the selected process key signal KP, 56, and is used to further adjust the gain of the input video signal A', 50 is accordance with the value of the selected process key signal to generate the output video signal A'', 54 with a selected gain.

If the value of the request key signal KD, 64, is selected by the minimum circuit 62 to have the valve of the input key signal KA because the gain of the input video signal V' has already been reduced by more than the value of the independent key signal, then the ratio provided by the ratio circuit 66 will be equal to one, since it will receive at both of its inputs a value corresponding to that of the input key signal KA. As a result, the input video signal A', 50, will not have its gain further adjust it in value, since the multiplier circuit 59 receives a process key signal KP over line 56 which has a value of unity. As a result, the gain of the input video signal A', 50 is not further reduced, which is the desired result because the gain of the input video signal was previously adjusted to a value less than that represented by the independent key signal KI, 60.

In the event the value of the input key signal KA is greater than that of the independent key signal KI, the minimum circuit 62 and the ratio circuit ration 66 cooperate to provide a selected processing key signal KP whose value corresponds to that of the independent key signal KI. As a result the gain of the input video signal A', 50, is reduced by an amount determined by the value of the independent key signal KI to form an output video signal A'', 54, with the selected gain as if it had been processed by the independent key signal KI, 60, alone, instead of by both the input key signal KA, 58, and the independent key signal.

Figure 2:
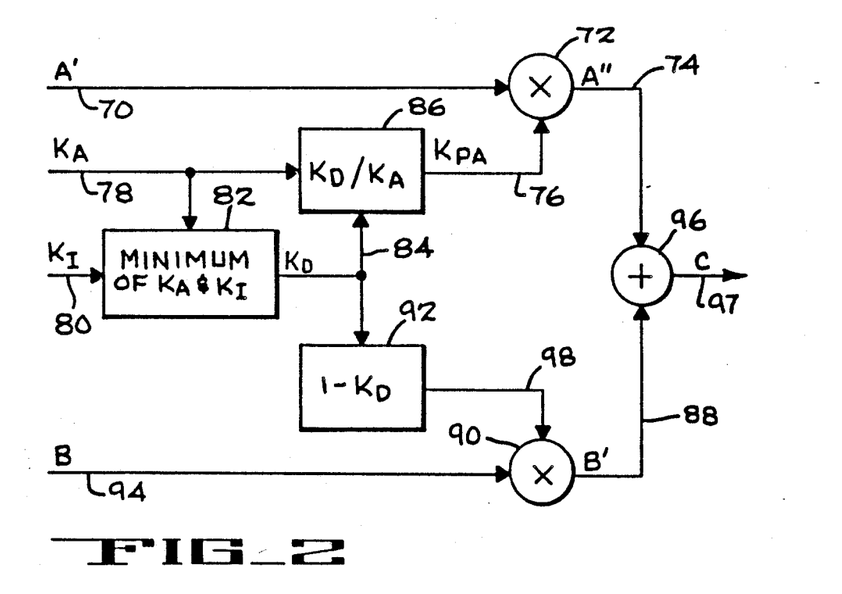
FIG. 2 is a schematic block diagram of another embodiment of a system for combining video signals of different possible gains in accordance with the present invention.

Referring now to FIG. 2, which illustrates a system to combine an input video signal KA, 70, whose gain has been previously adjusted to a level determined by the value of the input key signal KA, 78, with another input video signal B, 94, whose gain has not been reduced, but is at the nominal reference level, typically, unity gain. Both of these input video signals A' and B have their respective gains adjusted in accordance with the present invention according to the value of an independent key signal KI, 80, and the reciprocal of the value of an input key signal KA, 78, with the value of the input key signal signifying the gain to which one of the input signals, namely, KA, has been previously adjusted. The system illustrated in FIG. 2 is similar to that illustrated in FIG. 1, in that the processing of the input video signal A' to form the output video signal A'' is identical to that described with reference to the embodiment of FIG. 1. As previously described, the input video signal A', 70, has its gain adjusted by a video signal multiplier circuit 72 to produce the output video signal A'', 74, having the selected gain.

The selected process key signal KPA, 76, is generated from the input key signal KA, 78, associated with the input video signal A', 70, and the independent key signal KI, 80. This selected process key signal KPA is generated through the cooperation of a minimum signal value determining circuit 82 and a ratio determining circuit 86. As described with reference to the embodiment illustrated in FIG. 1, the minimum circuit 82 operates to determine whether the input key signal KA, 78, signifies that the gain of the input video signal A', 70, has been reduced by the same amount or more than that signified by the value of the independent key signal KI. If the value of the input key signal KA, 78, is less than that of the independent key signal KI, 80, the minimum circuit 82 outputs the value of the input key signal KA, 78, as the request key signal KD, 84. On the other hand, if the value of the input key signal KA, 78, is greater than that of the independent key signal KI, 80, the minimum circuit 82 outputs the value of the independent key signal KI, 80, as the request key signal KD, 84. As in the embodiment of FIG. 1, the output of minimum circuit 82 is coupled to the inputs of the ratio circuit 86. The input key signals KA, 78, and the request key signal KD, 84, are operated upon by the ratio circuit 86 to determine the ratio of the value of the request key signal KD to the value of the input key signal KA. This ratio signal is coupled as the selected process key signal KPA, 76, and is used by the multiplier circuit 72 to adjust the gain of the input video signal A', 70 and form a first output gain adjusted video signal A", 74 with the selected gain.

This first output gain adjusted video signal A", 74, is coupled to a first input of a video combiner 96, where it is combined with the other input video signal B, 94, after it has been also gain adjusted to form an output video signal C, 97, in the form of a combination of two separate video signals. The input video signal B, 94, has its gain adjusted in accordance with the difference between a selected reference level, typically unity, and the value of the request key signal KD, 84, which difference value forms a second selected process key signal KPB, 98. This gain adjustment is performed by a video signal multiplier circuit 90 to generate a second output gain adjusted video signal B', 88. The two output gain adjusted video signals A", 74, and B', 88, have respective gain which when added, or combined, together equal one. By design, the input video signal A' is reduced in gain by at least the value of KD, 84, and therefore, the other input video signal B, 94, is reduced in gain by an amount corresponding to 1-KD. The reduction in gain of the input video signal B, 94, is accomplished by the signal differencing circuit 92, which takes the output of the minimum circuit 82, namely, KD, 84, and subtracts it from unity to form the second selected process signal KPB, 98, which is coupled to the video multiplier circuit 90. Using the selected process key signal KPB, 98, the video multiplier circuit 90 operates on the input video signal B, 94, to form the second gain adjusted output video signal B', 88.

Figure 3:
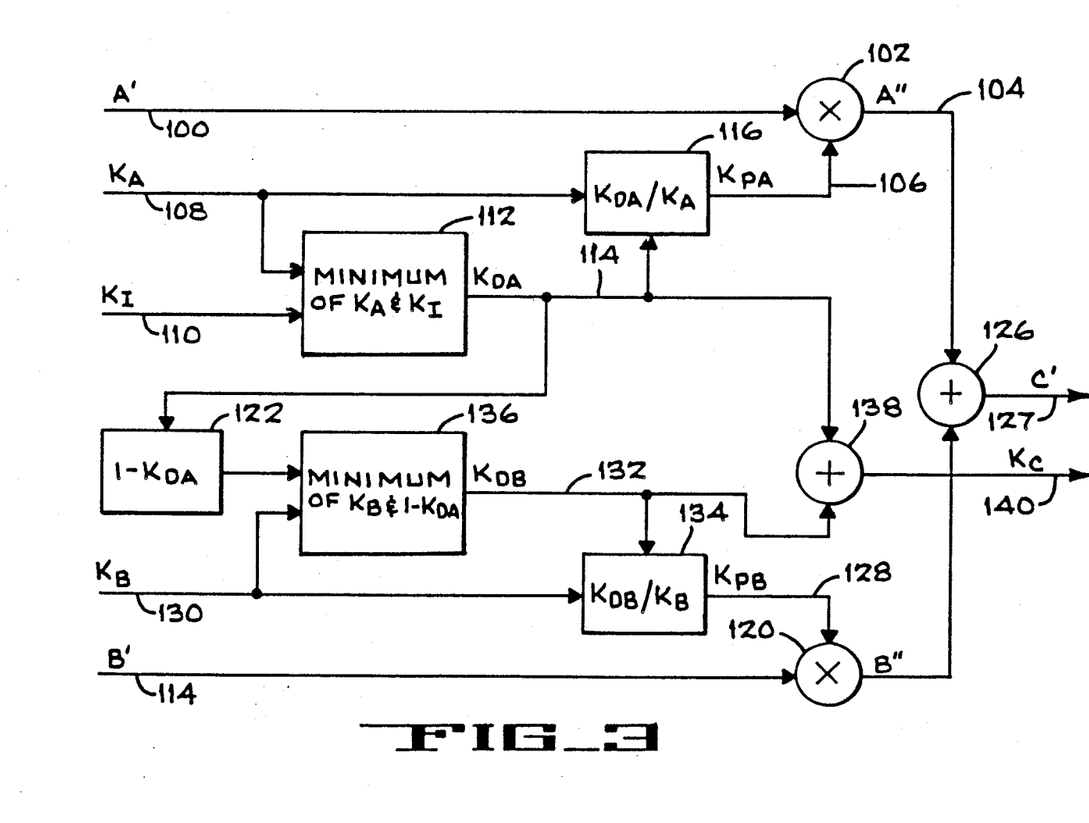
FIG. 3 is a schematic block diagram of a further embodiment of a system for combining video signals of different possible gains in accordance with the present invention.

Referring now to FIG. 3, a preferred embodiment is illustrated of a system to combine two previously gain adjusted input video signals according to an independent key KI, 110. The system illustrated in FIG. 3 is similar to the embodiment of FIG. 2, in that the gain adjustment of the input video signal A', 100, to form a first gain adjusted output video signal A", 104, in accordance with the input key signal KA and the independent key signal KI is identical. The previously gain adjusted input video signal A', 100, is coupled to a video signal multiplier circuit 102 to have its gain adjusted thereby to produce the first gain adjusted output video signal A", 104.

The selected process key signal KPA, 106, is generated from the input key signal KA, 108, associated with the input video signal A', 100, and the independent key signal KI, 110. As previously described with reference to the embodiments of FIGS. 1 and 2, the selected process key signal KPA, 106, is generated through the cooperation of a minimum circuit 112 and a ratio circuit 116 to insure that the gain of the input video signal B', 100, is never increased above the value of its gain as received on line 100. The first gain adjusted output video signal A" provided by the multiplier circuit 102 is coupled by line 104 to one input of a video signal combiner 126, where it is combined, or added with a second gain adjusted output video signal B", 118, to form an output video signal C', 127, which is a composite of the two gain adjusted output video signals.

The second gain adjusted output video signal B", 118, is derived from the second input video signal B', 114, by adjusting the gain of that signal in accordance with the value of a second selected process key signal KPB, 128. In this embodiment, the second input video signal has a gain which has been adjusted previously in accordance with the value of a second input key signal KB, 130. When combined, the two gain adjusted output video signals A'", 104, and B", 118, form an output video signal C', 127, which has a combined signal gain of unity. By design, the input video signal A' is reduced in gain by an amount determined by the values of the input key signal KA, 108, and the independent key signal KI, 110. The amount is determined by the request key signal KDA, 114. Therefore, the second input video signal B', 114, should have its gain adjusted in accordance with the minimum of the value of its associated input key signal KB, 130, and the value of the difference between the reference value, normally, unity, and the first request key signal KDA. This difference is determined by the differencing circuit 122. A second minimum circuit 126 receives the difference signal provided by the differencing circuit 122 and the second input key signal KB, 130, and responsibly provides as a second request key signal KDP, 132, the minimum value of the two signals received at its input. This second request key signal KDB, 132, is coupled to one of the inputs of a second ration circuit 134. This ratio circuit 134 also receives the second input key signal KB, 130, and responsibly provides at its output a second selected process key signal KPB, 128, whose value is set at the ratio of the second request key signal to the value of the second input key signal. This second selected process key signal is provided over line 128 to the control input of the video signal multiplier circuit 120 to adjust the gain of the second input video signal B', 114, and thereby form the second gain adjusted output video signal B", 118. As previously described, this video signal is coupled to the video combiner 126 for addition to the first gain adjusted output video signals A", 104, to form the output video signal C', 127.

In the system of FIG. 2, the output video signal C, 97, is treated as an unprocessed video signal by any downstream usage device. This is because, the gain of the combined gain adjusted output video signals A", 74, and B', 88, is one. In the embodiment of FIG. 3, the gains of both input video signals A', 100, and B', 114, have been previously reduced prior to being processed by the system. Therefore, it is possible that either or both of the input video signals have been reduced in gain below the level requested by the independent key signal KI. When this occurs, the gains of one or both of the two input video signals A", 104, and B", 118, could be reduced to a value whereby the gain of the combined output video signal C', 127, is one or less. Consequently, in the embodiment of FIG. 3, a combined output key signal KC, 140, is formed by summing the two request key signals KDA, 114, and KDB, 132, in the summing circuit 138. This output key signal represent the actual reductions to which the gains of the two gain adjusted output video signals A", 104, and B", 118, respectively, have been set.

In summary, the above three embodiments all implement a form of the present invention. Common to each is the initial determination as to whether the input video signal or signals have already been reduced in gain by more than that requested by the independent key signal. If an input video signal has been reduced in gain by more than that requested by the key signal, then the video signal is further processed by a key signal of one, which results in no further reduction of gain. If the video signal has been reduced in gain by less than that requested by an independent key signal, then a process key signal is determined which, when used to further process the gain of the video signal, reduces the gain of the video signal by an amount such that the total reduction in gain on the output video signal is the amount requested by the independent key signal.

In the embodiment of FIG. 2, the input video signal whose gain has not been previously adjusted is processed with a difference key signal, and combined with another video signal whose gain is adjusted by a related key signal. The result of this process of the gain of the two input video signals is a new output video signal which is formed as a combination of the two gain adjusted video signals, and has a net gain of unity.

In the embodiment of FIG. 3, both input video signals have had their gains adjusted previously. These two signals have their gains further adjusted to form a new output video signal which is a combination of the two input video signals and has a net gain of one or less. Thus this system also provides an output key signal associated with the new output video signal indicating the gain.

Figure 4:
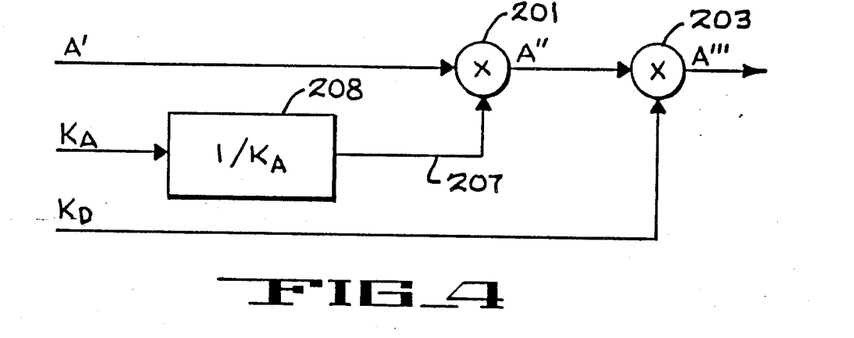
FIG. 4 is a schematic block diagram of one embodiment of a circuit for adjusting the gain of video signals in accordance with the present invention.

Referring to FIG. 4, the input video signal A' has its gain adjusted in accordance with the value of a request key signal KD and the reciprocal of the value of an input key signal KA in successive and separate steps by a pair of multipliers 201 and 203 in the communication line 205 of the input video signal A'. The input key signal KA has a value that indicates the gain of the input video signal. This indicated gain signifies the gain of the input video signal A' relative to a reference gain, typically unity. As a result of the two multiplications, an output video signal A''' is provided having a selected gain determined by the value of the key signal KD. In the embodiment illustrated by FIG. 4, the two multiplications are shown as having the video signal A' gain first adjusted by the reciprocal KP of the value of the input key signal KA present on line 207 and, thereafter, by the key signal KD. The sequence of multiplications however can be reversed, such as in the embodiment of FIG. 5.

Figure 5:
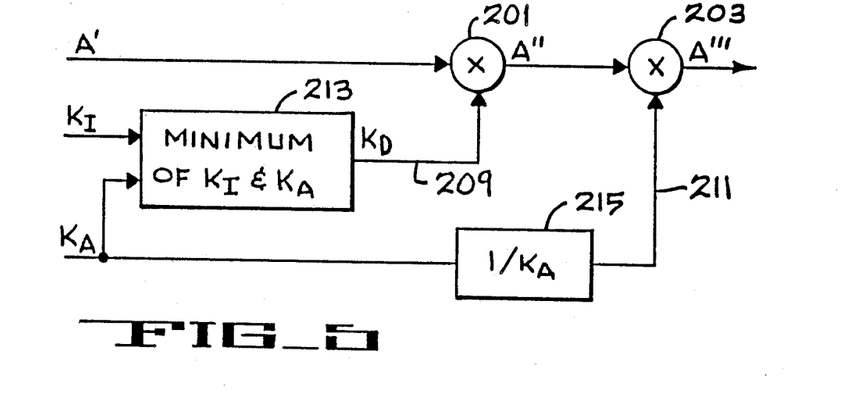
FIG. 5 is a schematic block diagram of another embodiment of a circuit for adjusting the gain of video signals in accordance with the present invention.
Figure 6:
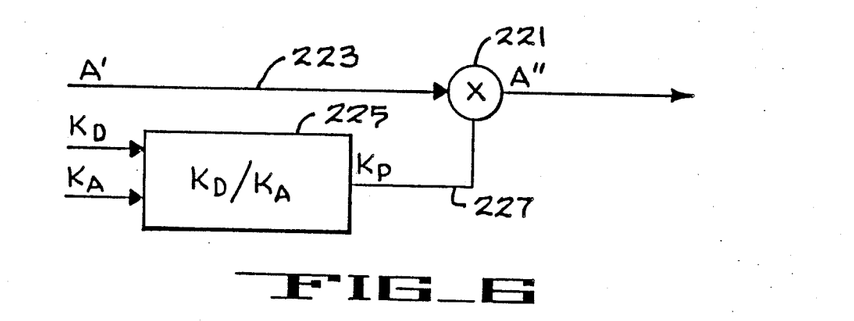
FIG. 6 is a schematic block diagram of a further embodiment of a circuit for adjusting the gain of video signals in accordance with the present invention.

Moreover, referring to FIG. 6, the two key signals KD and KA can first be combined in a inversely proportional relationship relative to the input key signal KA by a ratio circuit 225, whereby the input video signal a' on line 223 only has to be multiplied one time in a multiplier circuit 221 to form the desired output video signal A", each of the embodiments of FIGS. 4, 5 and 6 can be substituted as part, or in some cases all, of the key processing sections of FIGS. 2 and 3.

Referring to FIG. 5, an embodiment is shown similar to the embodiment of FIG. 1, except the sequence of multiplications of the gain of the input video signal relative to the independent key KI and input key KA is reversed. As illustrated therein, a minimum operation is performed on the two key signals KA and KI by the minimum circuit 213 to determine whose value indicates a smaller video signal gain. Whichever key signal indicates the smaller gain value, it is output by the minimum circuit 213, as request key KD, to the first multiplier circuit 201 in the input video signal path 205. The second multiplier circuit 203 in that path receives the reciprocal KP of the input key KA value provided by the reciprocal circuit 215 to multiply the results of the first multiplier circuit 201, and thereby provide the output video signal A''' with the desired gain.

While the embodiments disclosed herein are preferred, it will be appreciated that they are merely examples, and that various alternatives, modifications, variations or improvements thereon may be made by those skilled in the art from this teaching, which are intended to be encompassed by the following claims.

What is claimed is:

1. An apparatus for adjusting the level of a first signal to or below a level indicated by a second signal, a prior level of the first signal being indicated by a third signal, said apparatus comprising:
    means for determining a minimum signal between said second signal and said third signal;
    means for determining a ratio of said minimum signal to said third signal; and
    means for adjusting the level of said first signal according to the ratio of said minimum signal to said third signal.

2. The apparatus of claim 1 wherein said first signal is a video signal.

3. The apparatus of claim 1 wherein said first, second and third signals are digital signals.

4. The apparatus of claim 1 wherein said first, second and third signals are analog signals.

5. The apparatus of claim 1 wherein said means for determining said minimum signal is an analog AND gate.

6. The apparatus of claim 1 wherein said means for determining said ratio is a digital memory look-up table.

7. The apparatus of claim 1 wherein said means for adjusting is a digital multiplier.

8. An apparatus for adjusting the level of a video signal to or below a level indicated by a first key signal, a prior level of the video signal being indicated by a second key signal, said apparatus comprising:
    means for determining a minimum key signal between said first key signal and said second key signal;
    means for determining a ratio of minimum key signal to said first key signal; and
    means for adjusting the level of said video signal according to the ratio of said minimum key signal to said second key signal.

9. The apparatus of claim 8 wherein said video signal and said first and second key signals are digital signals.

10. The apparatus of claim 8 wherein said video signal and said first and second key signals are analog signals.

11. The apparatus of claim 8 wherein said means for determining said minimum signal is an analog AND gate.

12. The apparatus of claim 8 wherein said means for determining said ratio is a digital memory look-up table.

13. The apparatus of claim 8 wherein said means for adjusting is a digital multiplier.

14. An apparatus for adjusting the level of a video signal to a desired level indicated by a first key signal, the level of said video signal having been previously adjusted according to a second key signal indicative of the previous adjustment, comprising:
   means for determining a minimum key signal between said second key signal and said first key signal;
   means for determining a ratio of said minimum key signal to said second key signal; and
   means for receiving said video signal whose level has been previously adjusted and adjusting the level of same according to said ratio of said minimum key signal to said first key signal.

15. A method of adjusting the level of a first signal to or below a level indicated by a second signal, said first signal having been previously adjusted to a level indicated by a third signal, said method comprising the steps of:
   determining a minimum signal between said second signal and said third signal;
   determining a ratio of said minimum signal to said third signal; and
   adjusting the level of said first signal according to said ratio.

16. An apparatus for adjusting and combining first and second signals, the level of said first signal being adjusted to or below a level indicated by a third signal, a the first signal having a prior level indicated by a fourth signal, said apparatus comprising:
   means for determining a minimum signal between said third signal and said fourth signal;
   means for determining a ratio of said minimum signal to said fourth signal;
   means for adjusting the level of said first signal according to the ratio of said minimum signal to said fourth signal to produce a fifth signal;
   means for determining a remainder of said minimum signal from a maximum signal;
   means for adjusting the level of said second signal according to the remainder of said minimum signal from said maximum signal to produce a sixth signal; and
   means for combining said fifth and sixth signals to produce a combined signal.

17. The apparatus of claim 16, wherein said first and second signals are video signals, and said third, fourth and fifth signals are key signals.

18. The apparatus of claim 16, wherein said first and second signals are digital signals.

19. A method of adjusting and combining first and second signals, the level of said first signal being adjusted to or below a level indicated by a third signal, said first signal having been previously adjust ed to a level indicated by a fourth signal, said method comprising the steps of:
   determining a minimum signal between said third signal and said fourth signal;
   determining a ratio of said minimum signal to said fourth signal;
   adjusting the level of said first signal according to the ratio of said minimum signal to said fourth signal to produce an fifth signal;
   determining a remainder of said minimum signal from a maximum signal;
   adjusting the level of said second signal according to the remainder of said minimum signal from said maximum signal to produce a sixth signal; and
   combining said fifth and sixth signals to produce a combined signal.

20. An apparatus for adjusting and combining first and second signals, the level of said first signal being adjusted to or below a level indicated by a third signal, a prior level of the first signal being indicated by a fourth signal, a prior level of the second signal being indicated by a fifth signal, said apparatus comprising:
   means for determining a first minimum signal between said third signal and said fourth signal;
   means for determining a first ratio of said first minimum signal to said fourth signal;
   means for adjusting the level of said first signal according to said first ratio to produce a sixth signal;
   means for determining the remainder of said first minimum signal from a maximum signal;
   means for determining a second minimum signal between said remainder and said fifth signal;
   means for determining a second ratio of said second minimum signal to said fifth signal;
   means for adjusting the level of said second signal according to said second ratio to produce a seventh signal; and
   means for combining said sixth and seventh signals to produce a combined signal.

21. The apparatus of claim 20, wherein said first, second, sixth and seventh signals are video signals, and said third, fourth and fifth signals are key signals.

22. The apparatus of claim 20, further comprising means for combining said first and second minimum signals to produce an eighth signal indicative of the total level adjustment of said combined signal.

23. The apparatus of claim 22, wherein said first, second, sixth and seventh signals are video signals, and said third, fourth, fifth and eighth signals are key signals.

24. A method of adjusting and combining first and second signals, the level of said first signal being adjusted to or below a level indicated by a third signal, said first signal having been previously adjusted to a level indicated by a fourth signal, said second signal having been previously adjusted to a level indicated by a fifth signal, said method comprising the steps of:
   determining a first minimum signal between said third signal and said fourth signal;
   determining a first ratio of said first minimum signal to said fourth signal;
   adjusting the level of said first signal according to said first ratio to produce a sixth signal;
   determining the remainder of said first minimum signal from a maximum signal;
   determining a second minimum signal between said remainder and said fifth signal;
   determining a second ratio of said second minimum signal to said fourth signal;
   adjusting the level of said second signal according to said second ratio to produce a seventh signal; and combining said sixth and seventh signals to produce a combined signal.

25. The method of claim 24 further comprising the step of combining said first and second minimum signals to produce an eighth signal indicative of the total level adjustment of said combined signal.

26. A method of adjusting the gain of an input video signal in response to a request key signal to produce an output video signal having a selected gain, said request key signal having a value indicating a desired gain for the output video signal, wherein the initial gain of said input video signal is identified by the value of an input key signal, said value of the input key signal signifies the gain of the input video signal relative to a selected reference gain, said method comprising the steps of:
   detecting the value of the input key signal; and
   adjusting the gain of the input video signal in accordance with the value of the request key signal and the reciprocal of the value of the input key signal to produce the output video signal with the selected gain.

27. A method as defined in claim 26 wherein an independent key has a value indicating a proposed gain for the output video signals and further comprising the step of selecting one of said independent key signal and said input key signal according to the values of said independent and said input key signals to form said request key signal, and wherein the gain of the input video signal is adjusted in accordance with the values of the selected request key signal and the reciprocal of the value of said input key signal.

28. A method as defined in claim 27 wherein said step of selecting comprises selecting said one of said independent key and input key signals whose value indicates a smaller video signal gain, said output video signal having a gain corresponding to the desired gain when the value of the independent key indicates a smaller video signal gain and otherwise a gain corresponding to the gain identified by the input key signal.

29. A method as defined in claim 26, 27 or 28 wherein the adjusting step includes forming a process key signal in response to said request key signal and said input key signal to have a value which is inversely proportional to the value of the input key signal, and adjusting the level of the input video signal in accordance with the value of the process key signal to produce the output video signal at the selected level indicated by the value of said process key signal.

30. A method as defined in claim 29 wherein said process key signal is formed as the quotient of the value of the request key signal against the value of the input key signal.

31. A method as defined in claim 26, 27 or 28 wherein the adjusting step includes successively and separately adjusting the level of the input video signal according to the reciprocal of the value of the input key signal and to the value of the request key signal.

32. A method as defined in claim 31 wherein the level of the input video signal is first adjusted according to the reciprocal of the value of the input key signal.

33. A method of combining first and second input video signals to produce a combined output video signal, wherein at least one said input video signal has a gain identified by a value of an input key signal, the value of each input key signal signifies the input video signal gain relative to a selected reference gain, the gain of said at least one input video signal being adjusted in response to a request key signal to produce a first gain adjusted video signal of a selected gain, said method comprising the steps of:
   adjusting the gain of the input video signal whose gain is identified by the said one input key signal, the gain of said input video signal being adjusted in accordance with the value of the request key signal and the reciprocal of the value of the said one input key signal to produce the first gain adjusted video signal with the selected gain;
   detecting the difference between the selected gain and the reference gain;
   adjusting the gain of the other of said first and second video signals according to said detected difference to produce a second gain adjusted video signal; and
   combining said gain adjusted video signals to produce a combined output video signal.

34. A method if combining first and second input video signals to produce a combined output video signal, wherein said input video signals each have a gain identified by respective values of respective input key signals signify respective input video signal gains relative to a selected reference in response to a request key signal to produce a first gain adjusted video signal of a selected gain, said method comprising the steps of:
   adjusting the gain of the input video signal whose gain is identified by one of said first and second input key signals, the gain of that input video signal being adjusted in accordance with the value of the request key signal and the reciprocal of the value of the said one input key signal to produce the first gain adjusted video signal with the selected gain;
   detecting the difference between the selected gain and the reference gain;
   adjusting the gain of the other of said first and second video signals according to said detected difference to produce a second gain adjusted video signal; and
   combining said gain adjusted video signals to produce a combined output video signal.

35. The method of claim 34 further comprising the step of generating in response to said input key signals and the requested key signal an output key signal indicative of the gain of said combined output video signal.

36. The method of claim 34 wherein the step of adjusting the gain of said second input video signal further comprises the step of selecting the smaller of said detected difference or said second input key for use in adjusting said gain.

37. An apparatus for adjusting the gain of an input video signal in response to a request key signal to produce an output video signal having a selected gain, said request key signal having a value indicating a desired gain for said output video signal, wherein said gain of said input video signal is identified by the value of an input key signal, said value of the input key signal signifies the gain of the input video signal relative to a reference gain, comprising:
   means for computing the ratio of said request key signal divided by said input key signal; and
   means for adjusting the gain of said input video signal by said ratio of yield said output video signal having said selected gain.

38. The apparatus of claim 37 further comprising means for receiving an independent key signal and said input key signal and for outputting the minimum of said two key signals as said request key signal.

39. An apparatus for adjusting the gain of first and second input video signal in response to a request key signal to produce an output video signal having a selected gain, said request key signal having a value indicating a desired gain for said output video signal, wherein said gain of said first input video signal is identified by the value of an input key signal, said value of said input key signal signifies the gain of said first input video signal relative to a reference gain, comprising:

means for computing the ratio of said request key signal divided by said input key signal;

means for adjusting the gain of said first input video signal by said ratio of yield a gain adjusted first input video signal;

an input for receiving a second input video signal;

means for subtracting said request key signal from a reference gain to generate a difference key signal;

means for adjusting the gain of said second input video signal by said difference key signal to yield a gain adjusted second input video signal; and     means for combining said gain adjusted second input video signal with said gain adjusted first input video signal to generate an output video signal.

40. The apparatus of claim 39 further comprising means for receiving an independent key signal and said input key signal and for outputting the minimum of said two key signals as said request key signal.

41. An apparatus for adjusting the gain of first and second input video signals in response to a first request key signal and a second request key signal and for combining the two gain adjusted video signals so produced to produce an output video signal having a selected gain, said first request key signal having a value indicating a desired gain for a gain adjusted first input video signal, said second request key signal having a value indicating a desired gain for a gain adjusted second input signal, and wherein said gain of said first input video signal is identified by the value of a first input key signal relative to a reference gain, and wherein the gain of said second input key signal relative to a reference gain, comprising:

means for comparing the ratio of said first request key signal divided by said first input key signal to generate a first processing key signal;

means for adjusting the gain of said first input video signal by said first processing key signal to yield a gain adjusted first input video signal;

an input for receiving a second input video signal;

means for subtracting said first request key signal from a reference gain to generate a difference key signal;

means for receiving said difference key signal and said second input key signal and for outputting the minimum of said difference and said second input key signals as a second request signal;

means for computing the ratio of said second request key signal divided by said second input key signal to generate a second processing key signal;

means for adjusting the gain of said second input video signal by said second processing key signal to yield a gain adjusted second input video signal; and     means for combining said gain adjusted second input video signal with said gain adjusted first input video signal to generate an output video signal having said selected gain.

42. The apparatus of claim 41 further comprising means for receiving an independent key signal and said first input key signal and for outputting the minimum of said independent and first input key signals as said first request key signal.

43. An apparatus for adjusting the gain of an input video signal in response to a request key signal to produce an output video signal having a selected gain, said request key signal having a video indicating a desired gain for said output video signal, wherein said gain of said input video signal is identified by the value of an input key signal, said value of the input key signal signifies the gain of the input video signal relative to a reference gain, comprising:

means for computing the ratio of said reference gain divided by said input key signal; and     means for adjusting the gain of said input video signal by said ratio and by said request key signal to yield said output video signal.

44. The apparatus of said claim 43 further comprising means for receiving an independent key signal and said input key signal and for outputting the minimum of said independent key signal and said input key signal as said request signal.

* * * * *